United States Patent [19]

Resconi et al.

[11] Patent Number: 5,260,389
[45] Date of Patent: Nov. 9, 1993

[54] PROCESS FOR THE PREPARATION OF 1,5-HEXADIENE CYCLOPOLYMERS HAVING A HIGH CONTENT OF CYCLOPENTANE RINGS IN CIS-CONFIGURATION

[75] Inventors: Luigi Resconi, Ferrara; Romano Mazzocchi, Novara; Fabrizio Piemontesi, Vercelli, all of Italy

[73] Assignee: Himont Incorporated, Wilmington, Del.

[21] Appl. No.: 866,927

[22] Filed: Apr. 10, 1992

[30] Foreign Application Priority Data

Apr. 12, 1991 [IT] Italy ............ MI 91 A 001010

[51] Int. Cl.⁵ .................. C08F 4/642; C08F 36/20
[52] U.S. Cl. ...................... 526/160; 526/77; 526/127; 526/151; 526/165; 526/336
[58] Field of Search .......... 526/160, 165, 336, 127, 526/151, 153, 161

[56] References Cited

U.S. PATENT DOCUMENTS 3,435,020  3/1969  Olson ...................... 526/336 X
5,104,956  4/1992  Waymouth ................... 526/336

FOREIGN PATENT DOCUMENTS 0273655  7/1988  European Pat. Off.
0317240  5/1989  European Pat. Off.
0358103  3/1990  European Pat. Off.

OTHER PUBLICATIONS

Marvel, C. S., et al. Journal of American Chemical Society, vol. 80, pp. 1740–1744, 1958.
Makowski, H. S., et al. Journal of Polymer Science, Part A, vol. 2, pp. 1549–1566, 1964.
Cheng, H. N., et al. Journal of Applied Polymer Science, vol. 35, pp. 825–829, 1988.
Resconi, L. et al. Journal of American Chemical Society, vol. 112, pp. 4953–4954, 1990.

Primary Examiner—Fred Teskin

[57] ABSTRACT

Highly crystalline high melting 1,5-hexadiene cyclopolymers are prepared by carrying out the polymerization in the presence of a catalyst comprising a specific Zr or Hf metallocene compound and specific alumoxane compounds.

2 Claims, 2 Drawing Sheets

PROCESS FOR THE PREPARATION OF 1,5-HEXADIENE CYCLOPOLYMERS HAVING A HIGH CONTENT OF CYCLOPENTANE RINGS IN CIS-CONFIGURATION

The present invention relates to a process for the preparation of highly crystalline high melting 1,5-hexadiene cyclopolymers and products thus obtained.

It is known how to prepare 1,5-hexadiene cyclopolymers with Ziegler-Natta catalyst, as reported in the J. Am. Chem. Soc. 1958, 80, 1740, where the catalyst used is the $TiCl_4/Al(C_4H_9)_3$ mixture in various proportions.

However, the data reported in the above mentioned article show that for the 1,5-hexadiene cyclopolymer thus obtained, the cyclopolymerization is not complete (from 5 to 8% on the monomeric units contained in the chain maintain a double bond), and the melting points are low (85°-90° C). Moreover, long polymerization times are needed (from 50 to 70 hours) in order to obtain high monomer conversion.

In the J. Polym. Sci. part A 1964, 2, 1549, the polymerization of 1,5-hexadiene with $TiCl_4/Al(C_2H_5)_3$, $TiCl_3$. 0.22 $AlCl_3/Al(C_2H_5)_3$ and $TiCl_2$. 0.5 $AlCl_3/Al(C_2H_5)_3$ catalyst systems is discussed. The polymers thus obtained have melting points from 119° to 146° C.

An in-depth structural study of this type of cyclopolymers (obtained by polymerizing the 1,5-hexadiene with a $TiCl_3/Al(C_2H_5)_2Cl$ catalyst system) is reported in the J. Appl. Polymer. Sci. 1988, 35, 825, where NMR analysis demonstrates that the units which occur in the polymer chain are mainly groups having the

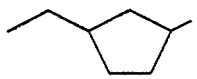

structure, where the cyclopentane rings can be either in cis- or trans- configuration. The data reported in said article proved that the polymers obtained with the above mentioned catalyst system contain cyclopentane rings in cis- and trans-configuration in a ratio of about 1/1.

The J. Am. Chem. Soc. 1990, 112, 4953, describes how by using a mixture of a zirconocene and a methylalumoxane in the cyclopolymerization of the 1,5-hexadiene one can control the configuration of the polymer cyclopentane rings. In particular, by using the $Cp^2ZrCl_2$ (Cp=cyclopentadienyl), a cyclopolymer predominantly of trans-configuration is obtained, while by using $Cp^*_2ZrCl_2$ (Cp*=pentamethylcyclopentadienyl) a cyclopolymer predominantly of cis- configuration is obtained. However, according to the above mentioned article, particularly in the case where it is desired to obtain cyclopolymers predominantly of the cis-configuration, the procedure must be carried out at very low temperatures. The best result (86% of rings with the cis-configuration) is obtained by carrying out the polymerization at -25° C.

Now the Applicant has found that the crystallinity in the 1,5-hexadiene cyclopolymer is particularly high in relation to the high content of rings in the cis- configuration of the polymer chain, as demonstrated see by comparing the attached FIGS. 1 and 2.

BRIEF DESCRIPTION OF THE DRAWINGS

In fact.

Figure 1:
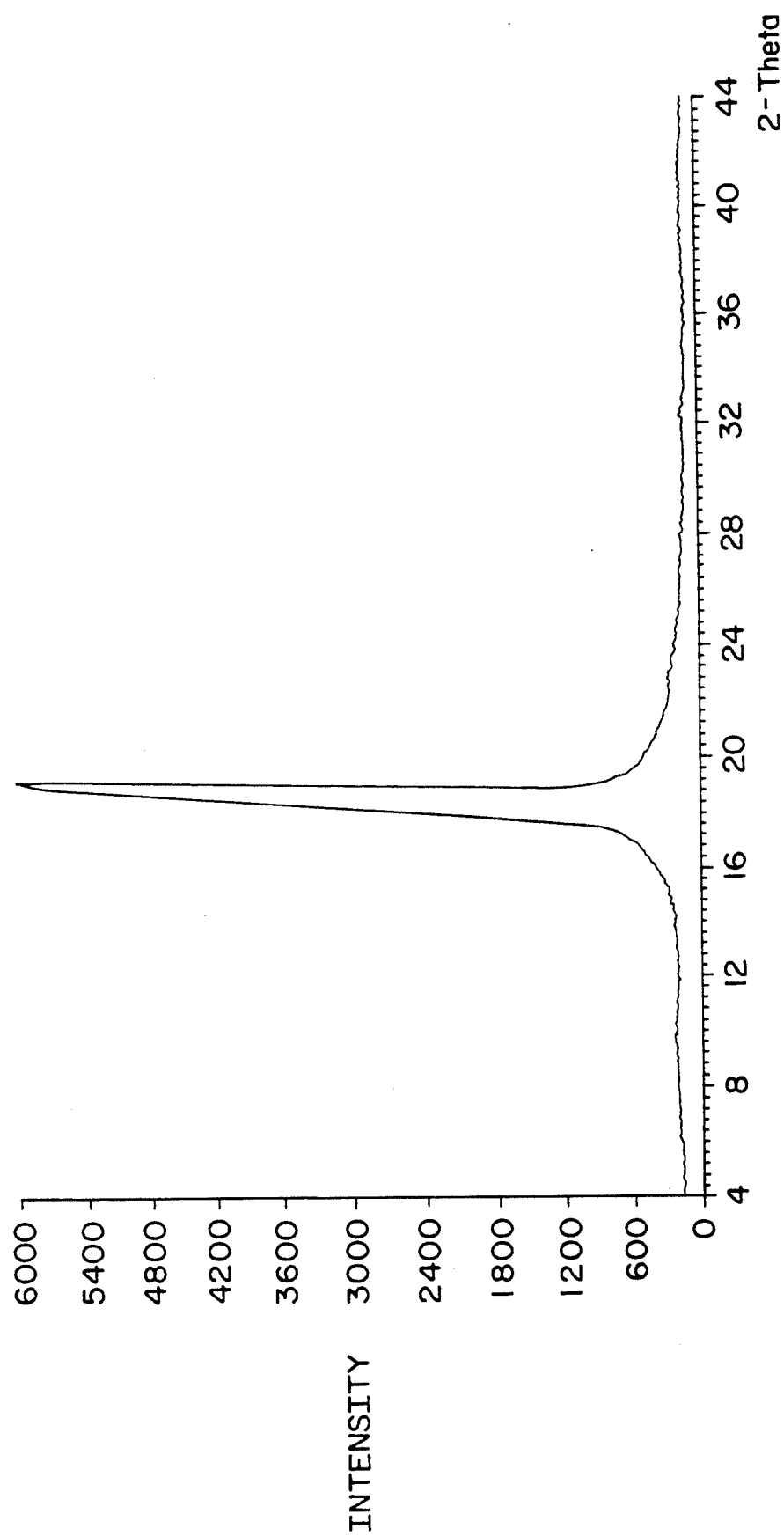
FIG. 1 shows the X-ray diffraction spectrum ($CuK\alpha$) of a poly (1,5-hexadiene) sample containing 87.9% of cyclopentane rings in cis- configuration (obtained according to Example 1 below). In this Figure a single nondiffused peak typical of a crystalline phase can be seen.
Figure 2:
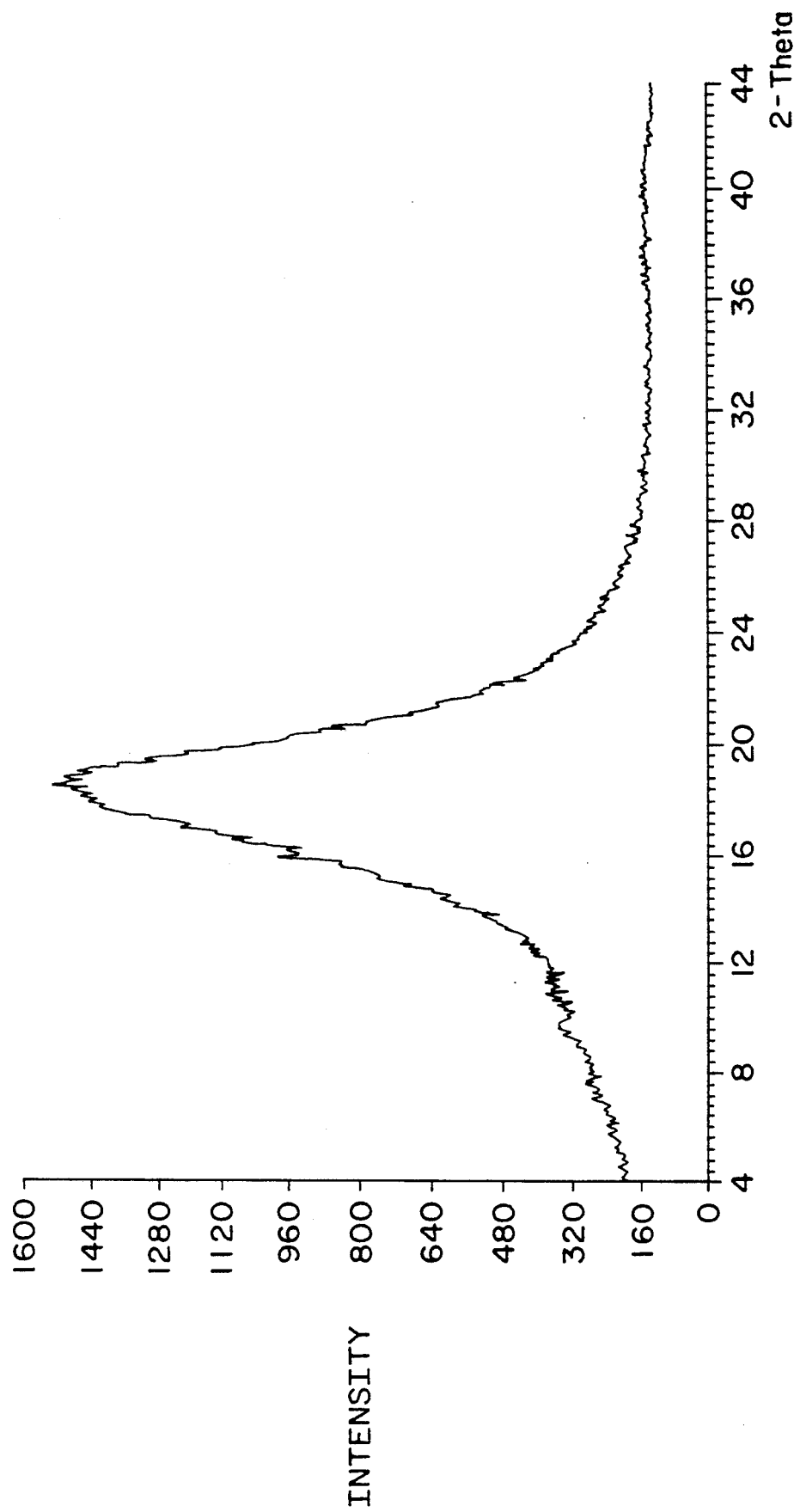
In FIG. 2, on the other hand, an X-ray diffraction spectrum of a poly (1,5-hexadiene) sample containing about 40% of cyclopentane rings in cis-configuration is shown, whereby a peak which is diffused and has little intensity, typical of a prevalently amorphous phase, can be seen.

The melting point is also particularly high in relation to the high contents of rings in cis- configuration, as demonstrated by the examples of the present invention.

Therefore, it would be very beneficial to have a process of polymerization which would allow one to obtain, economically (particularly without having to operate at extremely low temperature), highly crystalline high melting cyclopolymers of the 1,5-hexadiene, since this type of cyclopolymers offer high heat stability and good processability.

DETAILED DESCRIPTION OF THE INVENTION

Accordingly, the present invention provides a process for the preparation of 1,5-hexadiene cyclopolymers which comprises the polymerization of monomers in the presence of a catalyst consisting essentially of:

A) a metallocene compound having either the formula $$(C_5R_5)_2 MX^1X^2 \qquad (I)$$

where M is Zr or Hf, preferably Zr; the R radicals are the same or different and are hydrocarbon radicals, in particular $C_1$-$C_7$ alkyls; $X^1$ and $X^2$ are the same or different and are H, halogens, $C_1$-$C_{20}$ hydrocarbon radicals, in particular $C_1$-$C_{20}$ alkyl, or $C_7$-$C_{20}$ arylalkyl or alkaryl radicals, or —OR —OH, —SR or SH radicals, where R has the meaning defined above; or the formula $$Q(C_5R_4)_2 MX^1X^2 \qquad (I')$$

where M, R, $X^1$ and $X^2$ have the same meaning defined for the compound (I); Q is a bivalent radical $C_2R'_4$ or $Si_2R_4$, where the R' radicals are the same or different and are hydrogen or are the same as R;

B) one or more alumoxane compounds of the formula:

$$R'_2Al(-O-Al)_nR' \\ | \\ R' \qquad II)$$

where R' is a $C_2$-$C_{20}$ alkyl or alkene radical, or $C_7$-$C_{20}$ alkaryl radical; n is a number from 1 to 20. Particularly preferred are the compounds of the formula (I) where the R radicals are methyl and/or ethyl, and the compounds of formula (II) where the R' radicals are isobutyl.

Examples representative of metallocene compounds of formula (I) are:
$(C_5Me_5)_2ZrCl_2$; $(C_5Me_5)_2ZrMe_2$; $(C_5Me_5)_2ZrClMe$; $(C_5 Me_5)_2 ZrCliBu$; $(C_5Me_5)_2 ZrCl(CH_2C_6H_5)$;

$(C_5Me_5)_2ZrClCH_2SiMe_3$; $(C_5Me_4Et)_2ZrCl_2$; $(C_5Me_5)_2HfCl_2$; $(C_5Me_5)_2HfMe_2$; $(C_5Me_5)_2HfCliBu$; and $(C_5Me_5)_2HfCl(CH_2C_6H_5)$; where Me=methyl, Et=ethyl, Bu=butyl.

Examples representative of alumoxane compounds of formula (II) are:
$Et_2AlOAlEt_2$; $iBu_2AlOAliBu_2$; $iEs_2AlOAliEs_2$; and $iBu_2AlOAl(iBu)OAliBu_2$; where Es=hexyl.

These alumoxane compounds can be used alone or in a solution in hydrocarbon, such as hexane, heptane, benzene and toluene.

Moreover, the alumoxane compounds can contain variable quantities of trialkyl aluminum, such as $AlEt_3$ or $AliBu_3$. Said aluminum trialkyl can be the same used to prepare the alumoxane compound. The quantity of said aluminum trialkyl affects the activity of the catalyst and is preferably less than 50% in moles, more preferably less than 20%, according to what can be determined from the NMR analysis, with respect to the total Al content.

The polymerization can be carried out either in monomer alone, or mixed with a hydrocarbon such as hexane, heptane, and toluene.

The molar ratio between the (A) and (B) catalyst components is preferably from 20 to 5000, more preferably from 500 to 2000.

The (A) and (B) components can be added directly to the monomer, or monomers, to be polymerized, or can be previously mixed in a hydrocarbon solution.

The polymerization temperature is preferably from $-20°$ to $20°$ C.

The examples will show that an additional advantage of the process of the present invention is the fact that, compared to processes known in the art which use methylalumoxane as component (B), the instant process allows one to obtain 1,5-hexadiene cyclopolymers with higher molecular weight.

Moreover, according to the process of the present invention, the polymerization of 1,5-hexadiene can be carried out in the presence of other monomers such as ethylene, or higher α-olefins, in particular $C_3$–$C_8$, thus obtaining copolymers whose properties depend on the quantity and type of comonomers used.

Therefore, the definition of 1,5-hexadiene cyclopolymers according to the present invention comprises both the 1,5-hexadiene homopolymers, which are the preferred ones, and 1,5-hexadiene copolymers with one or more α-olefin, including ethylene.

The preferred 1,5-hexadiene cyclopolymers obtained with the process of the present invention have a percentage of cyclopentane rings in the cis-configuration greater than 87, for example from 87 to 95; crystallinity greater than or equal to 50%, measured with X-ray diffractometry; and a melting point greater than or equal to 175° C., generally from 175° to 185° C. Moreover, the intrinsic viscosity of the above mentioned polymers, measured in tetrahydronaphthalene at 135° C., is preferably greater than or equal to 0.5.

The following examples are given in order to illustrate and not limit the present invention.

In the examples, the percentage of cyclopentane rings in the cis-configuration has been measured by way of $^{13}C$ NMR.

The $^{13}C$ NMR spectra have been determined by way of a Bruker 200 MHz instrument, using $C_2D_2Cl_4$ as solvent, at 100° C. The melting points were measured with a Perkin Elmer DSC7 instrument with a 10° C./min scanning rate. The values relate to the highest point in the peak during the second melt.

The intrinsic viscosity was measured in tetrahydronaphthalene at 135° C.

Synthesis of the tetraisobutyl dialumoxane (TIBAO) (Method 1)

Into a 250 ml flask with three necks, equipped with magnetic agitator, in nitrogen atmosphere, are introduced 120 ml of anhydrous toluene and 16.64 g of $AliBu_3$ recently distilled, and the solution is cooled to 0° C. In a glass container connected to the reaction flask are introduced 0.755 ml of distilled water. By way of a diaphragm compressor, the system gases are circulated between the flask and the water container until all the water is used up, and then for an additional 10 minutes after that. The clear and colorless solution is concentrated to 100 ml by flashing the solvent at reduced pressure. The $^1H$ NMR analysis shows that the $AliBu_3$ content not reacted is at $<5\%$.

Preparation of the tetraisobutyl dialumoxane from the commercial product Schering (Method 2)

From 250 ml of heptane solution at 20% in declared weight of tetraisobutyl dialumoxane (Schering commercial product) the solvent is removed by evaporation at 0.2 torr pressure and 50° C.

The oily product thus obtained is dissolved in 30 ml of toluene, heated to 50° C. under vacuum, and then the solvent is flashed.

This treatment is repeated 4 times. The $^1H$ NMR analysis shows the presence of 8% of $AliBu_3$ (percentage of iBu moles of $AliBu_3$ based on the total iBu moles), while the quantity of said moles in the starting product was 30%.

EXAMPLES 1-3 AND COMPARATIVE EXAMPLE 1

The 1,5-hexadiene has been distilled in the rectifying column, and dehydrated with $CaH_2$. The purity of the monomer thus treated was higher than 99%.

POLYMERIZATION

The desired quantity of 1,5-hexadiene is introduced into an armed glass cylinder in nitrogen atmosphere. In another armed cylinder is introduced the aluminum compound solution in the desired solvent, then the proper quantity of $Cp^*_2ZrCl_2$ dissolved in toluene is added. The ingredients are reacted at room temperature for 5 minutes, and then the resultant solution thus obtained is added to the monomer to be polymerized, which has been thermoregulated at the polymerization temperature.

The polymerization is interrupted by adding methanol, then HCl is added in order to dissolve the catalyst residues, and the content is filtered and then washed with methanol. The polymerization conditions, and the properties of the products obtained are shown in Table 1.

By comparing the intrinsic viscosity of Example 2 and comparative Example 1, it can be seen that with the process of the present invention cyclopolymers having a high intrinsic viscosity and therefore higher molecular weight are obtained.

EXAMPLE 4: 1,5-HEXADIENE/ETHYLENE COPOLYMERIZATION

Into a 250 ml glass autoclave in an ethylene atmosphere and containing 13.8 g of 1,5-hexadiene and 30 ml of toluene, is introduced a solution, maintained for 5 minutes in the absence of monomer, of 20 ml of toluene, 1.96 mg of Cp*$_2$ZrMe$_2$, and 0.743 g of TIBAO prepared according to Method 2. The ethylene pressure is brought to 2 atm, and it is stirred for 15 minutes at constant pressure and 20° C. 4.15 g of solid polymer are obtained. The DSC shows only one melt peak, with T$_m$=121° C.

Other features, advantages and embodiments of the invention disclosed herein will be readily apparent to those exercising ordinary skill after reading the foregoing disclosure.

In this regard, while specific embodiments of the invention have been described in considerable detail, variations and modifications of these embodiments can be effected without departing from the spirit and scope of the invention as described and claimed.

TABLE 1

| Ex. n. | Alumoxane | Al (μ moles) | Al/Zr (molar) | Hexadiene (g) | PT (°C.) | Pt (h) | Toluene ml | Yield* | Tm °C. | % Cis | I.V. dl/g |
|---|---|---|---|---|---|---|---|---|---|---|---|
| 1 | TIBAO[1] | 28.7 | 840 | 36.7 | 20 | 26 | 28 | 3070 | 179.5 | 87.9 | — |
| 2 | TIBAO[2] | 15 | 1000 | 41.5 | 20 | 4 | 60 | 10300 | 176.3 | 89.6 | 0.57 |
| 3 | TIBAO[2] | 15 | 1000 | 13.8 | 0 | 4 | 4 | 2190 | 183.8 | 91.5 | — |
| comp 1 | MAO | 3 | 1000 | 13.8 | 20 | 1 | 5 | 16400 | 172.3 | — | 0.44 |

*(g polymer/g Zr)
[1] Prepared according to method 1
[2] Prepared according to method 2
MAO: methyl alumoxane Shering dried under vacuum
PT: Polymerization temperature
Pt: Polymerization time
Tm: Melting temperature
I.V.: Intrinsic viscosity

We claim:

1. A process for the preparation of 1,5-hexadiene cyclopolymers, comprising the polymerization of 1,5-hexadiene or 1,5-hexadiene with ethylene or C$_{3-8}$ alpha-olefin or combinations thereof in the presence of a catalyst consisting essentially of:

A) a metallocene compound having either the formula $$(C_5R_5)_2 MX^1X^2 \qquad (I)$$

where M is Zr or Hf; the R radicals are the same or different and are C$_1$-C$_7$ hydrocarbon radicals; X$^1$ and X$^2$ are the same or different and are H, halogens, C$_1$-C$_{20}$ hydrocarbon radicals, —OR, —OH, —SR, or SH radicals, where R has the meaning defined above; or the formula $$Q(C_5R_4)_2 MX^1X^2 \qquad (I')$$

where M, R, X$^1$ and X$^2$ have the same meaning defined for the compound (I); Q is a bivalent radical C$_2$R'$_4$ or Si$_2$R$_4$, where the R' radicals, are the same or different and are hydrogen or are the same as R;

B) one or more alumoxane compounds of the formula:

$$R'_2Al(\!-\!O\!-\!Al)_nR' \quad \text{(II)}$$
$$\qquad\qquad\qquad |$$
$$\qquad\qquad\qquad R'$$

where R' is a C$_2$-C$_{20}$ alkyl or alkene radical, or C$_7$-C$_{20}$ alkaryl radical; n is a number from 1 to 20.

2. The process of claim 1, wherein the polymerization is carried out at a temperature from −20° to 20° C.

* * * * *